July 25, 1939.  G. A. GIESELER  2,167,236

FILTERING APPARATUS

Filed June 17, 1938  2 Sheets-Sheet 1

Inventor

GEORGE A. GIESELER.

By Robb&Robb

ATTORNEYS

July 25, 1939.  G. A. GIESELER  2,167,236
FILTERING APPARATUS
Filed June 17, 1938  2 Sheets-Sheet 2

Inventor
GEORGE A. GIESELER

By Robert Cobb

ATTORNEYS

Patented July 25, 1939

2,167,236

UNITED STATES PATENT OFFICE 2,167,236

FILTERING APPARATUS

George A. Gieseler, Cleveland, Ohio, assignor to Dracco Corporation, Cleveland, Ohio, a corporation Application June 17, 1938, Serial No. 214,361

9 Claims. (Cl. 183—58)

This invention deals with certain problems involving the use of so-called automatic filters of the types designed for employment in chemical, smelting, and allied industries. Such filters are utilized for the collection of various kinds of chemical powders and oxides where continuous operation of an installation is required or desired, or like uses.

It has heretofore been proposed in this art of filtering apparatus to avail of a housing in which are arranged a filter bag or bags customarily made of cotton or wool, depending upon the nature of the gas and its temperature. Shaking mechanism for the bags for facilitating the cleaning thereof is provided. It has been found, however, that cotton and wool filter bags may only be used where the temperature of gas or gases is approximately below 200° F. for the cotton and approximately 250° F. for the woolen cloth bags. It has therefore been impracticable to use such bags for the usual filtering action when higher temperatures of gases must be dealt with.

Another consideration enters into the situation of use of these filter bags, because they must be made of a material that will not be destroyed by chemical characteristics of a gas such as $SO_2$ and $SO_3$, for instance.

In dealing with the problem of securing a suitable filter bag, I have found by experimentation that glass cloth as manufactured today has offered the greatest possibilities to overcome the difficulties to which I have referred above. However, I have found that to use glass cloth for the filter bags in the ordinary type of filtering apparatus, in which the bags are attached to a stationary member at one end and a vibrating member at the other end, severe shaking of the bags is such that the glass cloth will not stand up. This is doubtless due to the fact that the usual vibrating or shaking mechanism, acting upon cloth and woolen bags, flaps or flips these bags somewhat after the manner of flapping of a rug in shaking out the dust. Glass cloth will not withstand such action, and therefore in the carrying out of my invention I have designed a filtering apparatus which utilizes a special type of shaking mechanism to be used during the cleaning period of operation of the bags, and which shaking mechanism I have found to give good results in that it is fully adapted to the employment therewith of the glass cloth that is so excellently resistant to higher temperatures and to chemical destruction.

The shaking mechanism of my invention may be used with other than glass cloth types of bags, but its particular importance lies in its adaptability to the glass cloth type of filter bag.

Specifically speaking, the filter apparatus of the invention consists of novel features residing particularly in the employment of a vibrating or shaking means adapted to be attached to one end of a filter bag, the opposite end of the filter bag being attached to a flexible diaphragm which acts in conjunction with the vibrating or shaking mechanism in a peculiar way to enable the glass bag to withstand effectively the shaking action incident to the cleaning operation thereof.

One embodiment of the invention is shown in the accompanying drawings, in which:

Figure 2 is a horizontal sectional view through the structure of Figure 1, taken about on the line 2—2 and looking downwardly in the direction of the arrows.

Figure 3 shows partly in section and partly in elevation a common form of hydraulic vibrator that may be substituted for the mechanical eccentric type of vibrator which is shown according to the illustration of Figure 1.

Figure 1:
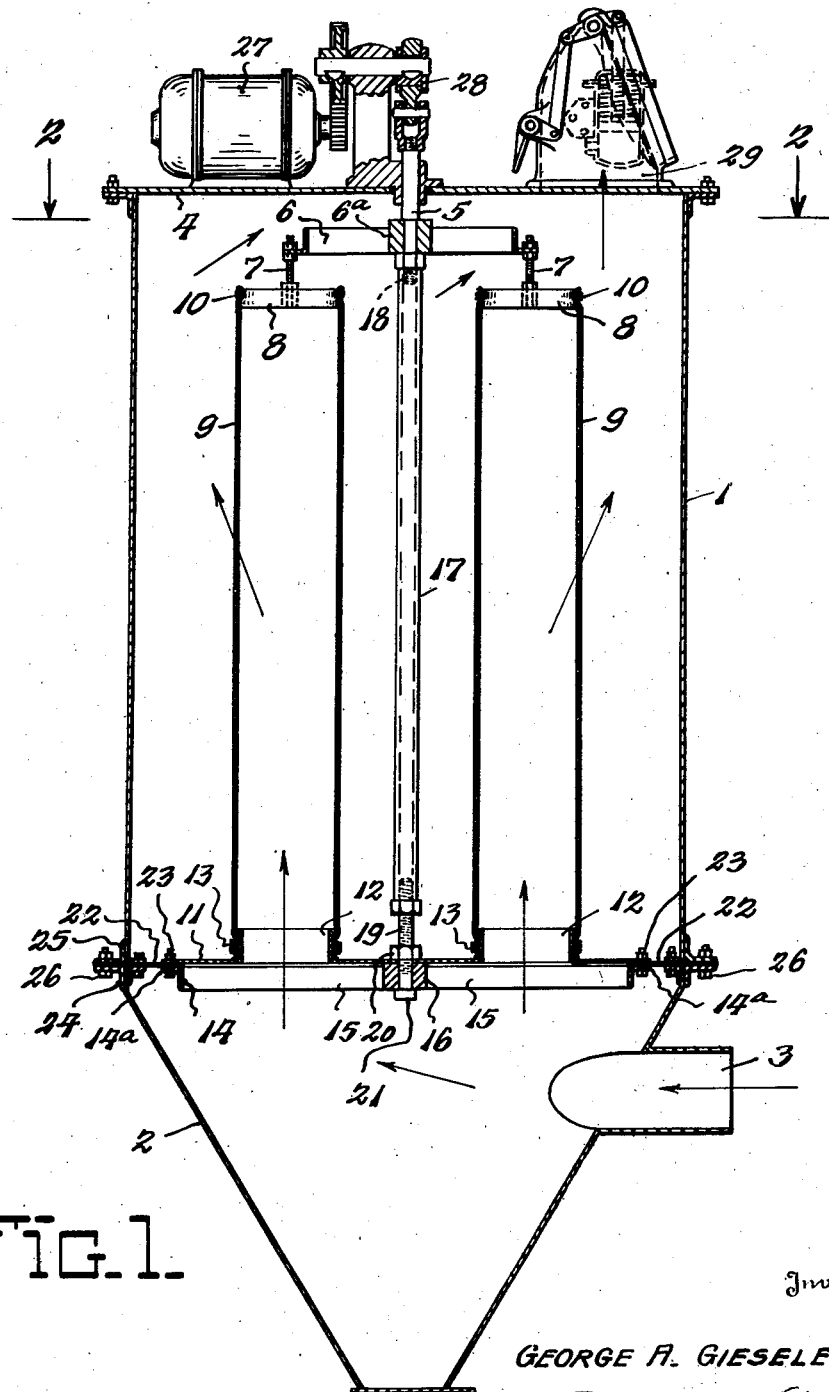
Figure 1 is a vertical sectional view of an automatic filter embodying the invention.

Referring to a preferred form of my apparatus, such as illustrated in the drawings, it is notable that there is provided a structure comprising the housing or casing 1 having the hopper 2 at its lower end, the upper portion of which hopper is dimensioned with substantially the same receiving area as comprised by the cross sectional diameter of the housing 1. A suitable dust laden gas inlet 3 leads into the hopper 2 and is adapted to supply the substance or gas which is to be filtered to the lower end of the hopper 1. At its upper end the housing 1 is equipped with a cover 4 and passing through the central portion of the cover is a vertically movable rod 5 adapted to be reciprocated for effecting a shaking action of the filtering means now to be described.

The rod 5 carries near its lower end the bag holder frame 6 from which depend suitable threaded rod members 7 that support covers 8 of the filter bags 9. The uppermost portions of the filter bags 9 are attached to the covers 8 by suitable clamps 10 of annular form.

The bags 9 depend from the cover members 8 to which they are secured, and are connected at their lower ends with a flexible diaphragm structure. This flexible diaphragm structure is made up of a plate 11 formed with upwardly projecting collars 12, one of the latter for the lower end of each bag 9. At its lowermost end each bag 9 is attached to its collar 12 by a clamping member 13 similar to the members 10, previously referred to, and readily detachable, as are the members 10.

Included within the diaphragm structure there is also provided a ring or annulus 14 connected by spokes 15 with a central hub or boss 16 disposed beneath the diaphragm plate 11.

Depending from the actuating and supporting rod 5 that carries the bag holder frame 6 is a vibrator shaft 17. Said shaft 17 has detachable screw connection at its upper end, as shown at 18, with the rod 5, and similar connection at its lower end with an attaching rod 19 having the threaded portion carrying the nut 20. The rod 19 passes through the boss or hub 16 and has a head 21 beneath the part 16. The nut 20 is a clamp nut and cooperates with the head 21 to clamp the parts 16 and 11 together.

Between a horizontal flange 14a of the ring or annulus 14 of the diaphragm structure and the underside of the plate 11 near its periphery, is clamped the innermost portion of the flexible member 22 of the diaphragm structure. Suitable bolts 23 are employed to connect the parts 14a, 11, and 22. The flexible member 22 of the diaphragm structure, at its outermost portion, is attached to the wall of the housing or casing 1 at about the juncture point between the lower end of said housing and the hopper 2. Annular angle members or plates, 24 on the upper portion of the hopper, and 25 on the lower portion of the housing, are used to join these parts together by the clamping bolts 26, and at the same time the horizontal portion of the parts 24 and 25 clamp therebetween the outermost portion of the flexible member 22 of the diaphragm structure.

It is notable that the bag holder frame 6 consists of a ring or annulus connected to a hub portion 6a by suitable spokes 6b. The rod 5 or uppermost part of the vibrator shaft passes through the hub member 6a and is clamped thereto in an obvious manner.

Now any suitable means may be employed for effecting the vibration or shaking of the shaft 17, the bag holder frame 6, and the bags 9. That illustrated in Figure 1 includes a motor 27 adapted to drive an eccentric 28 suitably connected to the upper end of the rod 5 of the vibrator shaft. By the rotation of the eccentric 28 the bag holding frame is adapted to be vibrated at high speed vertically, and in like manner the bags 9 will be correspondingly raised and lowered with accelerated movements. Such movement of the bags 9 is permitted because they are attached at their lower ends to the flexible diaphragm structure previously described.

It is within the purview of the invention, however, to substitute for the mechanical vibrating means for the rod 5 and shaft 17 the hydraulic or pneumatic vibrating means shown in Figure 3, which latter is of a conventional or known type, and effective results may be achieved. The particular vibrating mechanism for the shaking of the bag 9 is therefore not essential or important to the invention so long as an efficient such mechanism is availed of.

There is illustrated at the upper end of the housing 1 and in the cover 4 a gate closed outlet for dust laden gases or other materials to be filtered, designated 29.

It is to be understood that in the ordinary practice of use of the invention, automatic means are provided in the nature of a timing device for controlling the times when the shaking mechanism for the bags 9 is put into action. The shaking operations on the bags 9 are performed at intervals when cleaning of the bags of the dust or substances clogging their interstices is desired or required. In the cleaning operation the flow of air or gases passing through the housing 1 will be reversed from the normal flow, during which last the dust laden gases enter the inlet 3, pass into the upper portion of the hopper 2, pass upwardly into the bags 9, thence pass through the bags 9 into the general area within the housing 1, and issue from said housing at the outlet 29. The direction of the arrows in the drawings, Figure 1, is illustrative of the movement of the dust laden gases in the ordinary operation of the apparatus for filtering. When the shaking mechanism which vibrates the bag supporting parts is put into action, a reverse flow of currents through the housing 1, bags 9, and inlet 3 is effected to remove the clogging dust or particles from the interior walls of the bags 9 and cause them to be precipitated into the bottom of the hopper 2. At the bottom of the hopper 2 the latter may be equipped with a closure or discharge gate for dust or like substances received in the hopper in the bag cleaning operation.

The employment of the diaphragm structure which has been described above is for the purpose of its particular utility in conjunction with the filter bags 9 when made of glass cloth. Owing to the use of the flexible diaphragm structure described, when the bags 9 are shaken during the cleaning periods of their operation, the shaking being performed automatically in the customary use of this type of apparatus, the bag holder frame 6, the bags 9, and the bottom plate 11 included in the diaphragm structure move up and down together as one unit. In the down movement a slight pressure is created within the bags 9. During the upward movement this action is reversed and slight pressure is created outside the bags 9. This action dislodges the dust which has been collected inside the filter bags 9, so that said dust is then deposited or precipitates into the bottom of the hopper 2 below the housing body 1.

Due to the peculiar mounting and movement of the bags 9 and the special manner in which the pressures outside and inside the bags are effected as above described, it is possible with this invention to avail of the use of the glass cloth for filtering material purposes in the making of the bags 9. Therefore, gases or the like of much higher temperatures than 200 and 250°, for which cotton and woolen cloth bags are useful, may be handled in the filtering operation when the glass cloth filters are availed of. Not only will the glass cloth filters 9 afford the advantage of high resistance to the high temperatures of the dust laden gases, but they also afford the desirable resistance to destruction by deleterious chemicals that may be contained in the gases being treated.

It is notable that the flexible part 22 of the diaphragm structure is likewise preferably made from glass cloth to enable the obtaining of the same advantages derived incident to the use of the bags 9.

Having thus described my invention, what I claim as new and desire to secure by Letters Patent of the United States, is—

1. In filtering apparatus, a housing having an inlet and an outlet, a filter bag arranged so as to afford a filter member between the inlet and outlet, and means to vibrate the bag bodily in the housing to alternately create pressure inside and outside the bag for cleaning operation thereof, said last named means including means for restraining said bag against shortening axially during vibration thereof.

2. In apparatus of the class described, a closed housing having an inlet and an outlet, a filter bag suspended in a substantially vertical position in said housing, said filter bag having its upper end closed and its lower end open, means for bodily vibrating said filter bag in an upward and downward direction while maintaining the opposite ends of the bag a fixed distance apart, and means disposed transversely of said housing intermediate said inlet and outlet and connected to the filter bag adjacent to the open end of the latter, and flexibly connected to the housing so as to be bodily movable with the filter bag, whereby to alternately create within the bag a partial vacuum in one direction and a partial pressure in the opposite direction responsive to vibration of the filter bag as aforesaid.

3. In apparatus of the class described, a closed housing having an inlet and an outlet, a plurality of filter bags disposed in a substantially vertical position in said housing in spaced relation to each other, the upper ends of said filter bags being closed and their lower ends open, a spider connected to the upper ends of said filter bags, a plate disposed transversely across the housing at the lower ends of said filter bags and connected to the filter bags at a fixed distance from the spider, said plate having openings therein registering with the respective open ends of the bags, a flexible member interconnecting the plate with the housing at a point intermediate the inlet and outlet of the latter, and means operatively connected to the spider and plate for bodily vibrating the same and the filter bags, as a unit, in an upward and downward direction.

4. Apparatus as claimed in claim 3, wherein the flexible member is composed of glass cloth.

5. Apparatus as claimed in claim 3, wherein the filter bags are composed of glass cloth.

6. Apparatus of the class described, comprising a housing having an inlet and an outlet, a filter bag having a closed upper end and an open lower end disposed in a substantially vertical position in said housing and spaced therefrom, a rigid frame operatively connected to the upper and lower ends of the filter bag for maintaining said ends a fixed distance apart, a member including a flexible part interposed between the housing and the filter bag adjacent to the open lower end of the latter and intermediate the inlet and outlet of the housing, and means for imparting vibration in an upward and downward direction to the frame, and consequently to the bag and member.

7. Apparatus of the class described, comprising an axially upright housing having an inlet and an outlet, a plurality of filter bags disposed in said housing, each filter bag being positioned with its axis substantially parallel to the axis of the housing and having its upper end closed, means connected to the upper closed ends of the filter bags and constituting a common support for the same, means spaced below the supporting means aforesaid and connected to the lower ends of the filter bags and flexibly connected to the housing intermediate the inlet and outlet for maintaining the upper and lower end of each filter bag a fixed distance apart, and means for axially vibrating said upper bag supporting and lower bag connecting means, and the filter bags, together as a unit.

8. Apparatus of the class described, comprising a housing having an inlet and an outlet, a filter bag arranged so as to afford a filter member between the inlet and outlet, means connected to the respective opposite ends of the filter bag for restraining said ends against movement relative to each other, and means for bodily vibrating said filter bag while its opposite ends are so restrained.

9. In apparatus of the class described, a housing having an inlet and an outlet, a filter bag arranged so as to afford a filter member between the inlet and outlet, and vibrating means connected to the opposite ends of the filter bag for bodily vibrating the same in an axial direction and at a uniform rate throughout the length of the bag so that every part of the bag vibrates in unison.

GEORGE A. GIESELER.